US009027191B2

(12) United States Patent
Tyrrell et al.

(10) Patent No.: US 9,027,191 B2
(45) Date of Patent: May 12, 2015

(54) SUBSEA PIG HANDLER

(75) Inventors: Charles Edward Higham Tyrrell, Houston, TX (US); John Michael Ward, Katy, TX (US)

(73) Assignee: Shell Oil Company, Houston, TX (US)

( * ) Notice: Subject to any disclaimer, the term of this patent is extended or adjusted under 35 U.S.C. 154(b) by 42 days.

(21) Appl. No.: 13/881,674

(22) PCT Filed: Oct. 28, 2011

(86) PCT No.: PCT/US2011/058297
§ 371 (c)(1),
(2), (4) Date: Apr. 25, 2013

(87) PCT Pub. No.: WO2012/058546
PCT Pub. Date: May 3, 2012

(65) Prior Publication Data
US 2013/0212821 A1 Aug. 22, 2013

Related U.S. Application Data

(60) Provisional application No. 61/408,029, filed on Oct. 29, 2010.

(51) Int. Cl.
*F16L 55/46* (2006.01)
(52) U.S. Cl.
CPC ..................................... *F16L 55/46* (2013.01)

(58) Field of Classification Search
CPC ................................. B08B 9/005; F16L 55/46
USPC .............. 15/104.062, 104.061; 166/344, 311; 137/15.07
See application file for complete search history.

(56) References Cited

U.S. PATENT DOCUMENTS

| 5,842,816 A | 12/1998 | Cunningham ................. 405/170 |
| 6,139,644 A | 10/2000 | Lima .................................. 134/8 |
| 7,530,398 B2 | 5/2009 | Balkanyi et al. ............... 166/344 |
| 2006/0175063 A1 | 8/2006 | Balkanyi et al. ............... 166/357 |
| 2009/0223672 A1 | 9/2009 | Naik ............................. 166/344 |

FOREIGN PATENT DOCUMENTS

WO   WO2009133027   11/2009   ............. E21B 43/36

OTHER PUBLICATIONS

PCT International Search Report, Application No. PCT/US2011/058297 dated May 1, 2012.

*Primary Examiner* — Shay Karls

(57) ABSTRACT

A pig launching system comprising a pipe loop comprising a first end and a second end; a pig shuttle connected to the first end and the second end; a first opening in the pig shuttle aligned with the first end of the pipe loop; a second opening in the pig shuttle aligned with the second end of the pipe loop; and a slot within the pig shuttle movable between the first opening and the second opening.

10 Claims, 4 Drawing Sheets ent application claims priority from PCT/US2011/058297, filed Oct. 28, 2011, which claims priority from U.S. provisional application 61/408,029, filed Oct. 29, 2010, which is incorporated herein by reference.

BACKGROUND OF INVENTION

1. Field of the Invention

Embodiments disclosed herein relate to a subsea pig handler system.

2. Background Art

PCT Patent Publication WO 2009/133027 discloses an apparatus and method of producing gaseous and liquid component streams from at least two multi-phase streams in at least two pipelines, the method comprising at least the steps of: (a) passing a first multi-phase stream along a first pipeline and through a first slugcatcher system; (b) passing a second multi-phase stream through a second pipeline and a second slugcatcher system, (c) passing a first pig down the first pipeline to create a first pig-slug mass in the first pipeline; and (d) passing at least a fraction of the first multi-phase stream upstream of the first pig-slug mass to the second pipeline along a crossover line. WO 2009/133027 is herein incorporated by reference in its entirety.

U.S. Pat. No. 7,530,398 discloses a system for assuring subsea hydrocarbon production flow in pipelines by chilling the hydrocarbon production flow in a heat exchanger and causing solids to form, periodically removing deposits and placing them in a slurry utilizing a closed loop pig launching and receiving systems. U.S. Pat. No. 7,530,398 is herein incorporated by reference in its entirety.

SUMMARY OF INVENTION

One aspect of the invention provides a pig launching system comprising a pipe loop comprising a first end and a second end; a pig shuttle connected to the first end and the second end; a first opening in the pig shuttle aligned with the first end of the pipe loop; a second opening in the pig shuttle aligned with the second end of the pipe loop; and a slot within the pig shuttle movable between the first opening and the second opening.

DETAILED DESCRIPTION

In one aspect, embodiments disclosed herein relate to a subsea pig handler system. More specifically, embodiments disclosed herein relate to a subsea pig handler that may launch and retrieve a pig from a single unit.

Figure 1:
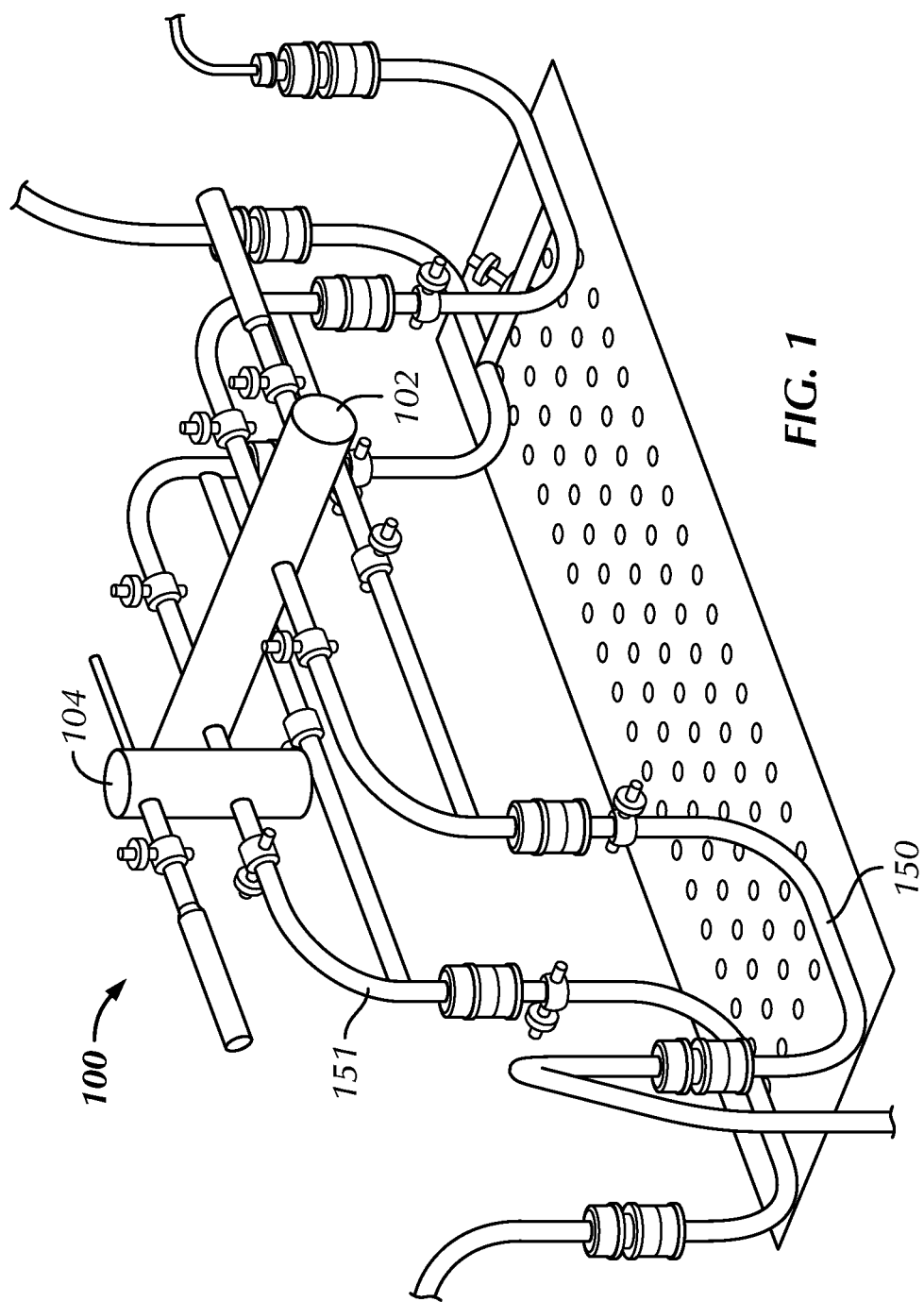
FIG. 1 is a perspective view of a subsea pig handler system in accordance with embodiments disclosed herein.

FIG. 1:

Referring to FIG. 1, a perspective view of a subsea pig handler system 100 in accordance with embodiments disclosed herein is shown. In this embodiment, subsea pig handler system 100 may be in connection with a network of channels 150 and 151 to allow fluid flow from a well (not shown), through a cooling loop (not shown), to an offshore platform (not shown). In addition to fluids, a pig (not shown) may move through the channels 150 and 151. The pig may be positioned within a main pig shuttle 102 and launched through channel 150 into the cooling loop and into a worn pig shuttle 104 through channel 151. Alternatively, the pig may be launched into channel 150 from the main pig shuttle 102, through the cooling loop, through the worn pig shuttle 104, and received back into the main pig shuttle 102 through channel 151. Once received by the main pig shuttle 102, the pig may be positioned to be re-launched into channel 150, through the cooling loop, and to the worn pig shuttle 104, to the platform, or back to the main pig shuttle 102 through channel 151.

Fluid flow from the well may be circulated through the cooling loop before it is directed to the platform in order to intentionally precipitate solids within the fluid flow. The cooling loop may reduce the temperature of the fluid flow sufficiently to cause solids to form. The geometry and length of the cooling loop may be a function of the deep sea water temperature, the production temperature, pressure and composition, and the temperatures and pressures at which the solids form. A pig may be released into the cooling loop to clean out the deposited solids which may have formed within the cooling loop.

Figure 2:
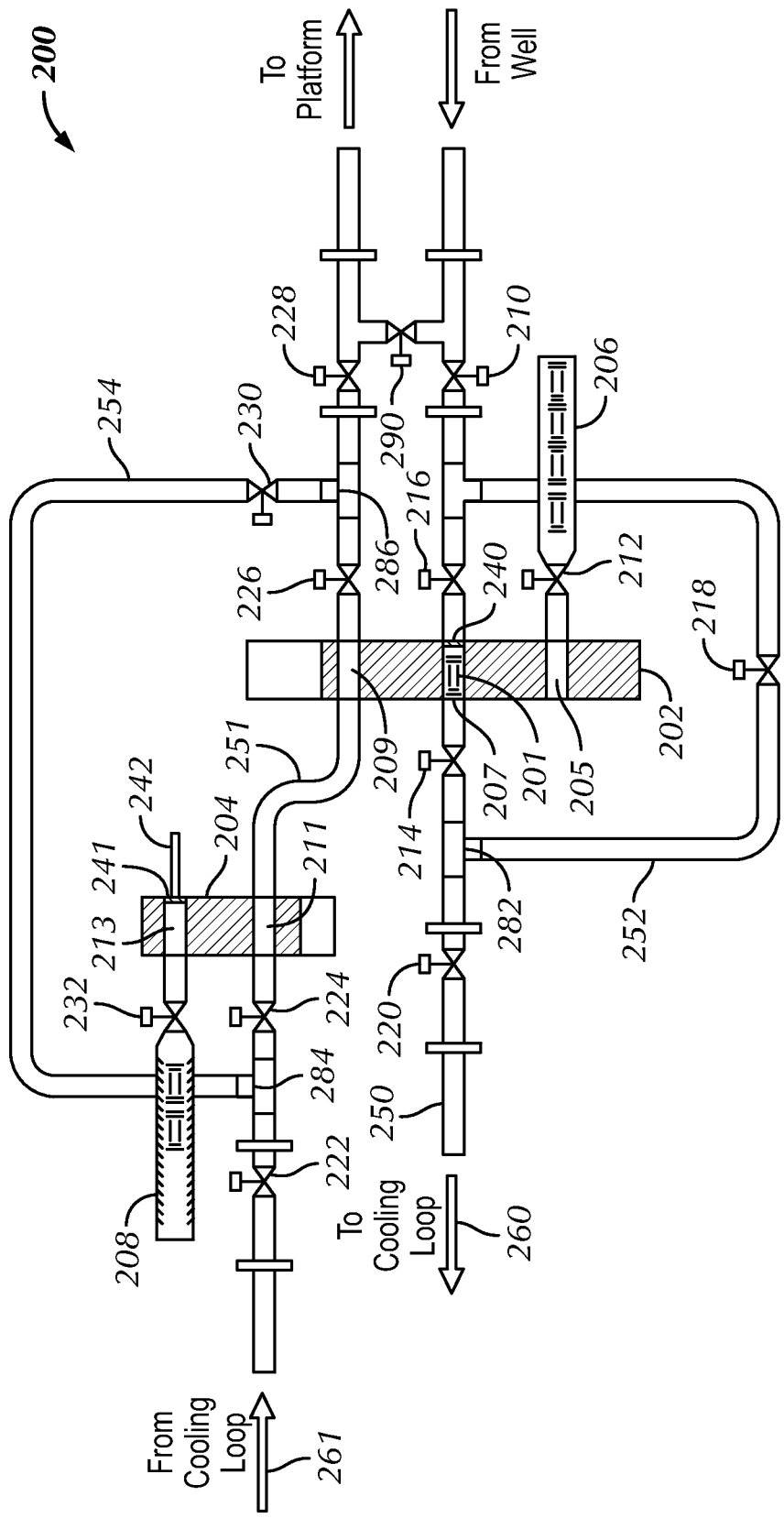
FIG. 2 is a schematic diagram of a subsea pig handler system in accordance with embodiments disclosed herein.

FIG. 2:

Referring now to FIG. 2, a schematic diagram of subsea pig handler system 200 in accordance with embodiments disclosed herein is shown. The subsea pig handler system 200, as shown, may be in connection with a network of channels 250 and 251 configured to allow fluid flow from a well, through a cooling loop (not shown), to a platform (not shown). In addition to fluids, a pig 201 may move through channels 250 and 251. The subsea pig handler system 200, as shown, may include a plurality of valves disposed at various locations throughout the network of channels 250 and 251. The valves may be opened or closed to control flow through channels 250 and 251. A new pig cartridge 206 is shown connected to a main pig shuttle 202 having slots 205, 207, and 209 that are configured to receive the pig 201. The new pig cartridge 206 is configured to contain new pigs, substantially similar to the pig 201, which may be moved from the new pig cartridge 206 into slot 205 of the main pig shuttle 202, as described in more detail below. Though the main pig shuttle 202 is shown with three slots, those having ordinary skill in the art will appreciate that the main pig shuttle 202 may include fewer or more slots.

A worn pig receiver 208 is shown connected to a worn pig shuttle 204 having slots 211 and 213 that are configured to receive the pig 201 once the pig 201 has been worn a predetermined amount. The worn pig receiver 208 is configured to receive worn pigs, substantially similar to the pig 201, which may be moved from slot 213 of the worn pig shuttle 204 into the worn pig receiver 208, as described in more detail below. Though the worn pig receiver 204 is shown with two slots, those having ordinary skill in the art will appreciate that the worn pig shuttle 204 may include fewer or more slots. As shown, the main pig shuttle 202 is connected to channels 250 and 251, and the worn pig shuttle 204 is connected to channel 251.

As shown, channel 250 is configured to allow fluid flow from a well (not shown), through the main pig shuttle 202, and into a cooling loop in the direction of arrow 260. Further, channel 251 may allow fluid flow from the cooling loop in the direction of arrow 261, through a worn pig shuttle 204, back through the main pig shuttle 202, to a platform (not shown). In addition to fluid, the pig 201 may also flow through the channels 250 along substantially the same path as described above.

In one embodiment, the main pig shuttle 202 may be mechanically shifted between a first position and a second position. In the first position, slot 205 of the main pig shuttle 202 may be in substantial alignment with channel 250, slot 207 of the main pig shuttle 202 may be in substantial alignment with channel 251, and slot 209 may not be in fluid communication with either channel 250 or channel 251.

In the first position, the main pig shuttle 202 is configured to allow the pig 201 to launch from slot 205 of the main pig shuttle 202 and into channel 250. Further, in the first position, as slot 207 may be in substantial alignment with channel 251, the main pig shuttle 202 is configured to catch the pig 201 in slot 207 of the main pig shuttle 202 using a bar 240, which is configured to prevent the pig 201 from moving past the main pig shuttle 202, in the direction of arrow 261, to the platform through channel 251. The bar 240 may prevent the pig 201 from moving past slot 207 of the main pig shuttle 202 in the direction of arrow 261 without significantly impeding fluid flow through slot 207 to the platform through channel 251. Those having ordinary skill in the art will appreciate that the bar 240 may be any type of structure disposed within the cross-section of slot 207 that allows a pig to be received into slot 207 by preventing the pig from moving past the main pig shuttle 202 in the direction of arrow 261 without significantly impeding fluid flow through slot 207 to the platform through channel 251. For example, a perforated plate or a slotted plate may be used to prevent the pig 201 from moving past slot 207 of the main pig shuttle 202 without significantly impeding fluid flow through slot 207.

In the second position, slot 205 of the main pig shuttle 202 may be in substantial alignment with the new pig cartridge 206, slot 207 of the main pig shuttle 202 may be in substantial alignment with channel 250, and slot 209 of the main pig shuttle 202 may be in substantial alignment with channel 251. In the second position, the main pig shuttle 202 is configured to allow a pig, substantially similar to the pig 201, to be moved from the new pig cartridge 206 into slot 205 of the main pig cartridge 202, if a valve 212 is in the open position. Further, in the second position, the pig 201 disposed in slot 207 of the main pig shuttle may be launched into channel 250 toward the cooling loop in the direction of arrow 250. Furthermore, the pig 201 moving through channel 251 in the direction of arrow 261 may pass through slot 209 of the main pig shuttle 202 and continue to move through channel 251.

Similarly, in one embodiment, the worn pig shuttle 204 may be mechanically shifted between a first position and a second position. In the first position, slot 211 of the worn pig shuttle 204 may be in substantial alignment with channel 251, and slot 213 of the worn pig shuttle 204 may be in substantial alignment with the worn pig receiver 208. In the first position, the worn pig shuttle 204 is configured to allow the pig 201 moving through channel 251 in the direction of arrow 261 to pass through slot 211 of the worn pig shuttle and toward the main pig shuttle 202 and the platform through channel 251. Further, a pig, substantially similar to the pig 201, which may be disposed in slot 213 of the worn pig shuttle 204, may be moved from slot 213 of the worn pig shuttle 204 into the worn pig receiver 208, if a valve 232 is in the open position.

In the second position, slot 211 of the worn pig shuttle 204 may not be in fluid communication with channel 250 or channel 251, and slot 213 of the worn pig shuttle 204 may be in substantial alignment with channel 251. In the second position, the worn pig shuttle 204 is configured to catch the pig 201 moving through channel 251 in the direction of arrow 261 in slot 213 of the worn pig shuttle 204 using a bar 241. The bar 241 prevents the pig 201 from moving past the worn pig shuttle 201, toward the main pig shuttle 202 and the platform through the channel 251. The bar 241 may be substantially similar to the bar 240, discussed above.

As shown in FIG. 2, the main pig shuttle 202 is in the second position and the worn pig shuttle 204 is in the first position. This configuration may allow the pig 201 to be launched from slot 207 of the main pig shuttle 202 into the cooling loop in the direction of arrow 260 through channel 250, return from the cooling loop in the direction of arrow 261 through channel 251, through slot 211 of the worn pig shuttle 204 and slot 209 of the main pig shuttle 202, and toward the platform.

Figure 3A:
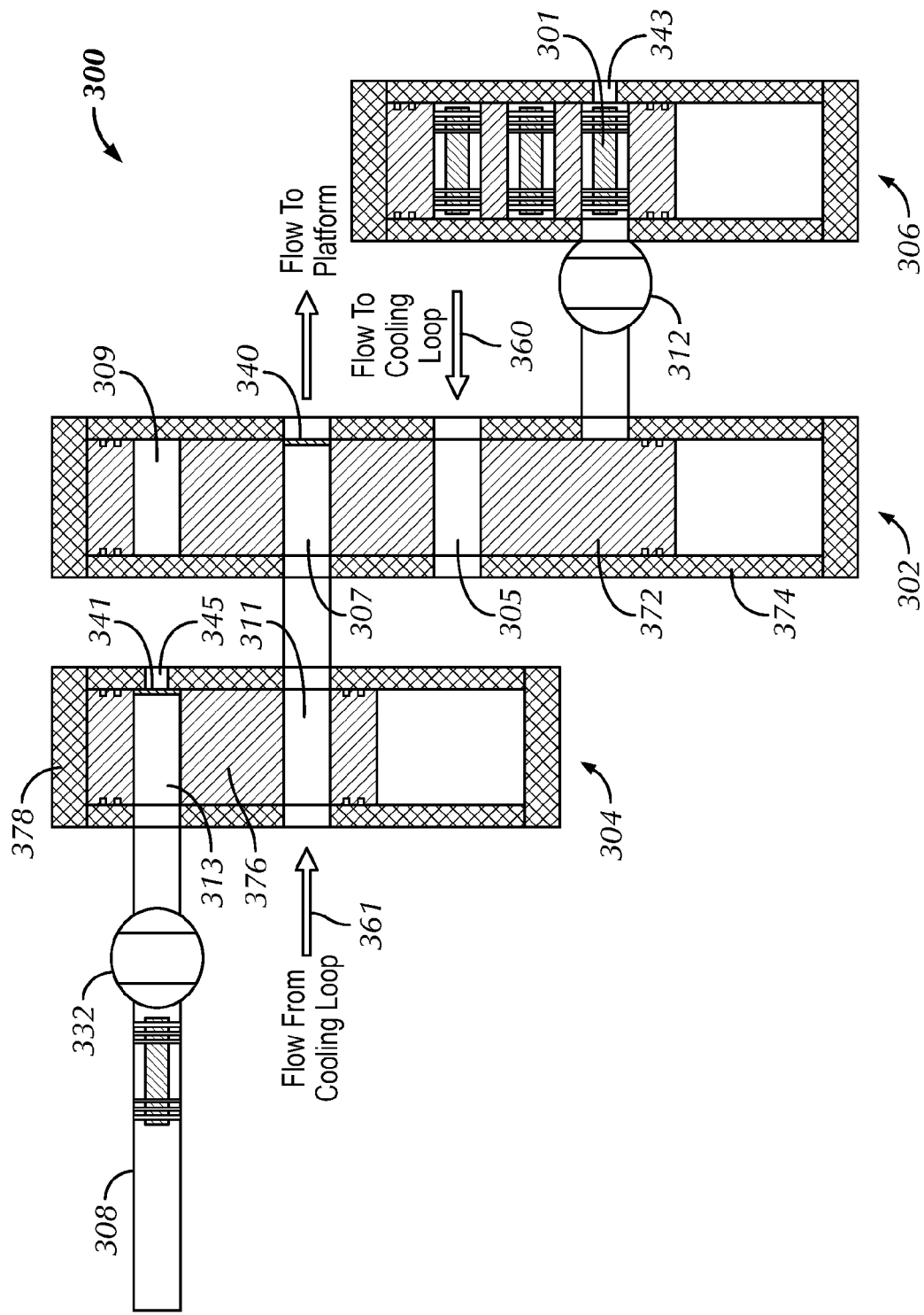
FIG. 3A is a cross-sectional view of a subsea pig handler system in a first position in accordance with embodiments disclosed herein.
Figure 3B:
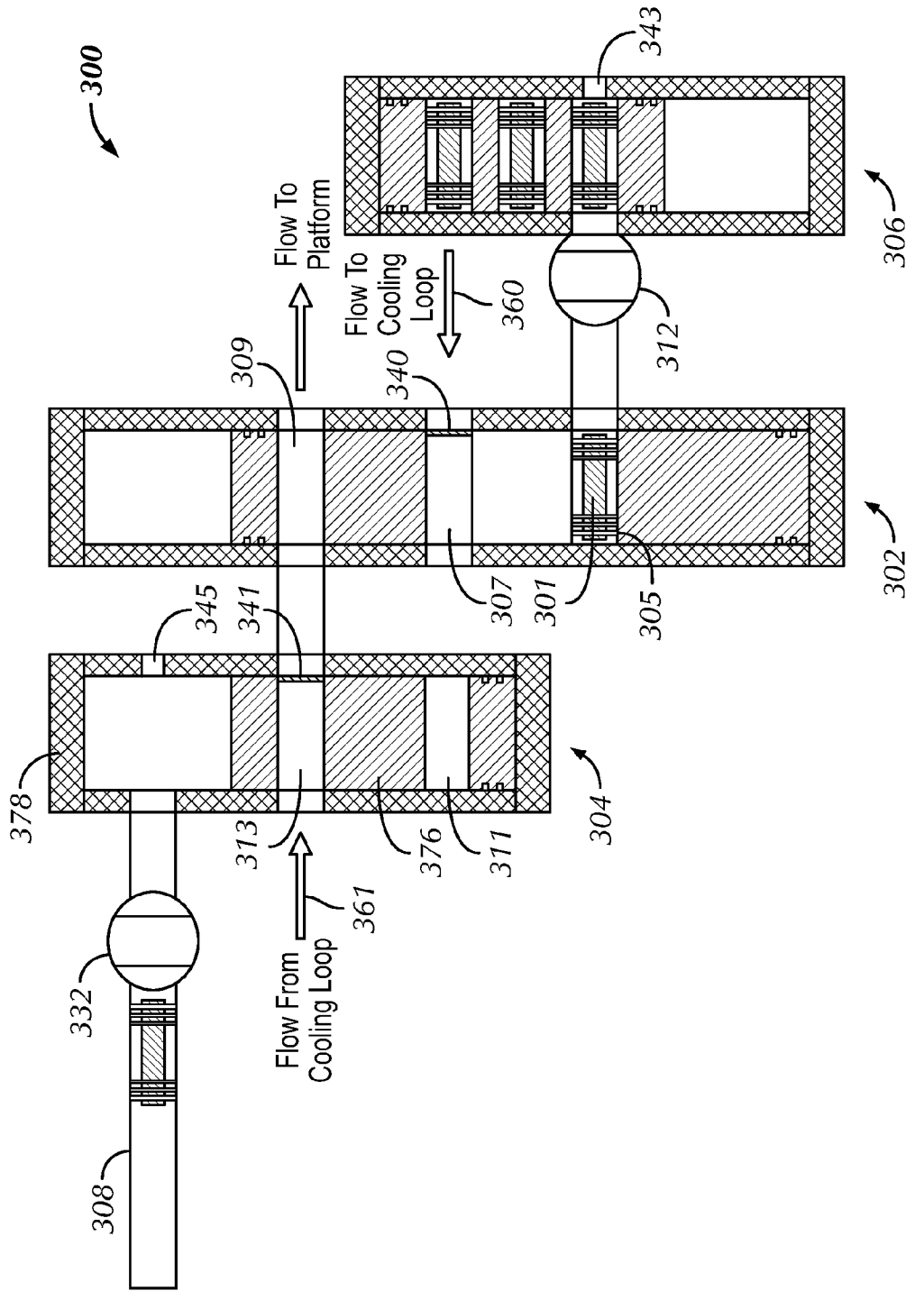
FIG. 3B is a cross-sectional view of a subsea pig handler system in a second position in accordance with embodiments disclosed herein.

FIGS. 3A & 3B:

Referring generally to FIG. 3A and 3B, cross-sectional views of a subsea pig handler system 300 in a first position and a second position in accordance with embodiments disclosed herein are shown, respectively. As shown, a main pig shuttle 302 includes a movable portion 372, a housing 374, and slots 305, 307, and 309 disposed in movable portion 372, which are configured to receive a pig 301. Further, as shown, slot 307 of the main pig shuttle 302 contains a bar 340, which may be substantially similar to the bar 240 discussed above, which is configured to catch the pig 301 within slot 307 of the main pig shuttle 302.

Similarly, as shown, a worn pig shuttle 304 includes a movable portion 376, a housing 378, and slots 311 and 313 disposed in movable portion 376, which are configured to receive the pig 301. As shown, slot 313 of the worn pig shuttle 304 contains a bar 341, which may be substantially similar to bar 241 discussed above, which is configured to catch the pig 301 within slot 313 of the worn pig shuttle 304.

The movable portion 372 of the main pig shuttle 302 may be mechanically shifted within the housing 374 between a first position and a second position. Similarly, the movable portion 376 of the worn pig shuttle 304 may be mechanically shifted within the housing 378 between a first position and a second position. Further, the movable portions 372 and 376 may be mechanically shifted between the first position and the second position independently from one another. For example, movable portions 372 and 376 may both be in the first position; however, movable portion 372 may be mechanically shifted from the first position to the second position, while movable portion 376 remains in the first position or vice versa. A motor may provide assistance in mechanically shifting the movable portions 372 and 376 of the main pig shuttle 302 and the worn pig shuttle 304, respectively, between the first position and the second position and between the second position and the first position. However, those with ordinary skill in the art will appreciate that a motor may not be required to mechanically shift the main pig shuttle 302 or the worn pig shuttle 304 between the first position and the second position. For example, a piston assembly may mechanically shift the main pig shuttle 302 or the worn pig shuttle 304 between the first position and the second position, or remotely operated valves may be used to provide a differential pressure that could be used to mechanically shift the main pig shuttle 302 or the worn pig shuttle 304 between the first position and the second position.

In some embodiments, the main pig shuttle 302 or the worn pig shuttle 304 may be in a linear arrangement as illustrated in the Figures, where the openings 305, 307, 309 may be aligned with the channels 250, 251 or new pig cartridge 206 by sliding the movable portion 372 linearly within shuttle 302. In other embodiments, the main pig shuttle 302 or the worn pig shuttle 304 may be in a circular arrangement (not shown), where the openings may be aligned with the channels by rotating a movable portion within a shuttle.

As shown, a new pig cartridge 306 is connected to the main pig shuttle 302. A valve 312 may move between an open position and a closed position to control the position of a pig 301 between the new pig cartridge 306 and the main pig shuttle 302. In one embodiment, the valve 312 may be a ball valve.

Further, as shown, a worn pig receiver 308 is connected to the worn pig shuttle 304. A valve 332 may move between an open position and a closed position to control the position of the pig 301 between the worn pig receiver 308 and the worn pig shuttle 304. In one embodiment, the valve 332 may be a ball valve. However, those having ordinary skill in the art will appreciate that valves 312 and 332 may not be ball valves. For example, the use of a shutter or any other mechanism that may be shifted between an open and closed position may control the connection between the new pig cartridge 306 and the main pig shuttle 302, or between the worn pig receiver 308 and the worn pig shuttle 304.

In an alternate embodiment, valves 312 and 332 may not be required to control the position of the pig 301 between the new pig cartridge 306 and the main pig shuttle 302, or between the worn pig receiver 308 and the worn pig shuttle 304. In this embodiment, the connection between the new pig cartridge 306 and the main pig shuttle 302, and between the worn pig receiver 308 and the worn pig shuttle 304, may be a simple channel connection without the use of a valve or a mechanism that may be shifted between an open and closed position. The position of the pig 301 between the new pig cartridge 306 and the main pig shuttle 302, or between the worn pig receiver 308 and the worn pig shuttle 304 may be controlled by pushers (not shown) configured to be disposed within pusher ports 343 and 345, as described in more detail below. The pushers may be able to control the position of the pig 301 between the new pig cartridge 306 and the main pig shuttle 302, or between the worn pig receiver 308 and the worn pig shuttle 304 with or without the use of valves, such as valves 312 and 332.

As shown in FIG. 3A, the valves 312 and 332 are in a closed position. The main pig shuttle 302 and the worn pig shuttle 304 are each shown in the first position, i.e., the movable portions 372 and 376 of the main pig shuttle 302 and the worn pig shuttle 304, respectively, are each in the first position. In the closed position the valve 312, i.e., the connection between the new pig cartridge 306 and the main pig shuttle 302, is closed. Further, valve 332, in the closed position, prevents the pig 301 from moving between the worn pig shuttle 304 and the worn pig receiver 308.

As shown, the main pig shuttle 302, in the first position, allows a pig, substantially similar to the pig 301, which may be disposed within slot 305 of the main pig shuttle 302 to be launched in the direction of arrow 360 into a cooling loop.

Furthermore, as shown, the worn pig shuttle 304, in the first position, allows a pig to pass through slot 311 of the worn pig shuttle 304 in the direction of arrow 361 and to be caught by a bar 340 disposed within slot 307 of the main pig shuttle 302.

As shown in FIG. 3B, the valves 312 and 332 are in an open position. The main pig shuttle 302 and the worn pig shuttle 304 are each shown in the second position, i.e., the movable portions 372 and 376 of the main pig shuttle and the worn pig shuttle 304, respectively, are each in the second position. The valve 312 is in the open position, which may allow the pig 301 to move from the new pig cartridge 306 into slot 305 of the main pig shuttle 302. Further, valve 332 is in the open position, which opens the connection between the worn pig shuttle 304 and the worn pig receiver 308.

The main pig shuttle 302 is in the second position, which may allow the pig 301 to be moved from the new pig shuttle 306 into slot 305 of the main pig shuttle 302 using a pusher, as described below. Furthermore, as shown, the worn pig shuttle 304 is in the second position, which may allow a pig moving in the direction of arrow 361 to be caught by a bar 341 disposed within slot 313 of the worn pig shuttle 304. The bars 340 and 341 may have similar structural features as the bars 240 and 241, as described above and shown in FIG. 2, and may allow fluid to flow through the slots 307 and 313 while preventing a pig from passing through.

As shown, the new pig cartridge 306 includes a pusher port 343 that may be in substantial alignment with the connection between the new pig cartridge 306 and the main pig shuttle 302. When the valve 312 is in the open position and the main pig shuttle is in the second position, as shown in FIG. 3B, the pig 301 may move from the new pig shuttle 306, through the open valve 312, into slot 305 of the main pig shuttle 302. A pusher (not shown) may be pushed through the pusher port 343 into the new pig cartridge 306, and may move a pig disposed within the new pig cartridge 306 through the open valve 312 and into slot 305 of the main pig shuttle 302. The pusher may be any type of rod or piston mechanism that may contact the pig 301 and push the pig 301 from the new pig cartridge 306 through the open valve 312 and into slot 305 of the main pig shuttle 302. However, those having ordinary skill in the art will appreciate that a pig shuttle with a pusher that is pushed through a pusher port may not be required to move a pig disposed within a pig shuttle into a slot of a pig receiver. For example, the use of a pig cartridge, as shown in FIG. 2, with a spring or other biasing device or mechanism or a hydraulic device may be used to move a pig disposed within a pig shuttle into a slot of a pig receiver.

Similarly, as shown, the worn pig shuttle 304 includes a pusher port 345 that may be in substantial alignment with the connection between the worn pig receiver 308 and the worn pig shuttle 304. When the valve 332 is in the open position and the worn pig shuttle is in the first position, as shown in FIG. 3A, a pig may move from slot 313 of the worn pig shuttle 304, through the open valve 332, into the worn pig receiver 308. A pusher (not shown), as discussed above, may be pushed through the pusher port 345 of the worn pig shuttle 304, and may move a pig disposed within slot 313 of the worn pig shuttle 304 through the open valve 332 and into the worn pig receiver 308. Alternatively, a spring, biasing member, or hydraulic device may be used to move a pig disposed within slot 313 of the worn pig shuttle 304 through the open valve 332 and into the worn pig receiver 308.

FIG. 2:

Referring back to FIG. 2, the general operation of the subsea pig handler system in accordance with embodiments disclosed herein will be discussed below. As shown, a pig 201 is disposed within slot 207 of the main pig shuttle 202 with fluid flowing in the direction of arrow 260. As shown, the main pig shuttle 202 is in the second position and the worn pig shuttle 204 is in the first position. The first positions of the main pig shuttle 202 and the worn pig shuttle 204 are described above and are shown in FIG. 3A. The second positions of the main pig shuttle 202 and the worn pig shuttle 204 are described above and are shown in FIG. 3B.

Initially, valves 210 and 228 may be closed and bypass valve 290 may be open. This valve configuration may allow fluid flow from the well to flow from the well to the platform, bypassing the subsea pig handler system 200. Alternatively, the bypass valve 290 may be closed, and valves 210, 220, 222, 224, 226, 228, 230, and launch bypass valve 218 may be opened to allow fluid flow from the well to flow through channels 250 and 251 of the subsea pig handler system 200 before flowing to the platform. Those having ordinary skill in the art will appreciate that few or more valves may be used in the subsea pig handler system 200 described above.

In certain embodiments, for fluid to flow from the well through channels 250 and 251 of the subsea pig handler system 200, valve 216 may be closed and launch bypass valve 218 may be opened. This valve configuration may allow fluid flow from the well to initially bypass the pig 201 and flow through a launch bypass loop 252, around the segment of channel 250 intersecting the main pig shuttle 202, instead of flowing directly along channel 250 and across the main pig shuttle 202. Once a pig 201 is disposed in a slot 205 of the main pig shuttle 202 and is ready to be launched into channel 250, valve 214 may be opened. Once valve 214 is open, valves 216 and 220 may be opened and launch bypass valve 218 may be closed to allow fluid to flow from the well directly through channel 250 and to the pig 201, thereby launching the pig into the channel 250 in the direction of arrow 260 toward the cooling loop. Closing the launch bypass valve 218 may allow the majority of the fluid flow from the well to flow directly to the pig 201, instead of some of the fluid flow passing around the pig 201 through the launch bypass loop 252. The pig 201 may pass more quickly and effectively through channel 250 into the cooling loop with the majority of the fluid flow from the well going directly through channel 250 to the pig 201. Fluid flow from the well flowing in the direction of arrow 260 may cause the pig 201 to move through channel 250 into the cooling loop. A barred tee 282 may prevent the pig 201 from moving from channel 250 into the launch bypass loop 252. The barred tee 282 may have similar structural features as the bars 240 and 241 as described above, and may allow fluid to flow through while preventing a pig from passing over.

Once the pig 201 has moved through the cooling loop, the pig 201 may return to the subsea pig handler system 200 and move through channel 251 in the direction of arrow 261 toward the platform. Again, as shown, the worn pig shuttle 204 is in the first position, as shown in FIG. 3A. In this configuration, slot 211 of the worn pig shuttle 204 is in substantial alignment with channel 251. With valves 222 and 224 open, the pig 201 may move through channel 251 in the direction of arrow 261, pass through slot 211 of the worn pig shuttle 204, and move toward the main pig shuttle 202. Further, as shown, the main pig shuttle 202 is in the second position, as shown in FIG. 3B. In this configuration, slot 209 of the main pig shuttle 202 is in substantial alignment with channel 251. With valves 226 and 228 open, the pig 201 may continue to move through channel 251 in the direction of arrow 261, pass through slot 209 of the main pig shuttle 202, and move toward the platform. Barred tees 284 and 286 may prevent the pig 201 from moving out of channel 251 into catch bypass loop 254. The barred tees 284 and 286 may have similar structural features as the bars 240 and 241 as well as the barred tee 282, as described above, and may allow fluid to flow through while preventing a pig from passing over.

Alternatively, to re-use the pig 201 after it has been launched into the cooling loop, the main pig shuttle 202 may be mechanically shifted from the second position, as shown in FIG. 2 and FIG. 3B, to the first position, as shown in FIG. 3A, after the pig 201 is launched from the main pig shuttle 202. In the first position, slot 205 of the main pig shuttle 202 may be in substantial alignment with channel 250, and slot 207 of the main pig shuttle 202 may be in substantial alignment with channel 251. Slot 207 of the main pig shuttle 202 may include bar 240 to prevent the pig 201 from moving past the main pig shuttle 202 once the pig 201 has entered slot 207. As the pig 201 moves through channel 251 toward slot 207, valves 224, 226, and 228 may be opened to allow fluid flow through channel 251 to the platform. Additionally, catch bypass valve 230 may be opened to allow fluid to flow through catch bypass loop 254 in addition to channel 251. Allowing fluid to flow through both catch bypass loop 254 and channel 251 may reduce the fluid flow through channel 251 and may reduce the speed of the pig 201 as it moves toward slot 207 and bar 240 of the main pig shuttle 202. Once the pig 201 is caught by bar 240 and is positioned in slot 207 of the main pig shuttle 202, the main pig shuttle 202 may be mechanically shifted from the first position, as shown in FIG. 3A, back to the second position, as shown in FIG. 2 and FIG. 3B, i.e., slot 207 of the main pig shuttle 202 may be in substantial alignment with channel 250. The pig 201 may then be re-launched from the slot 207 of the main pig shuttle 202 back into channel 250 in the direction of arrow 260 toward the cooling loop, as described above.

Alternatively, to dispose of a worn pig 201 once the pig 201 has been launched from the main pig shuttle 202 into the cooling loop, the worn pig shuttle 204 may be mechanically shifted from the first position, as shown in FIG. 2 and FIG. 3A, into the second position, as shown in FIG. 3B. In the second position, slot 213 of the worn pig shuttle 204 may be in substantial alignment with channel 251. Slot 213 of the worn pig shuttle 204 may include bar 241 that prevents the pig 201 from moving past the worn pig shuttle 204 once the pig 201 has entered slot 213. As the pig 201 moves through channel 251 toward slot 213, valves 224, 226, and 228 may be opened to allow fluid flow through channel 251 to the platform. Additionally, catch bypass valve 230 may be opened to allow fluid to flow through catch bypass loop 254 in addition to channel 251. Allowing fluid to flow through both catch bypass loop 254 and channel 251 may reduce the fluid flow through channel 251 and may reduce the speed of the pig 201 as it moves toward slot 213 and bar 241 of the worn pig shuttle 204. Once the pig 201 is caught by bar 241 and is positioned in slot 213 of the worn pig shuttle 204, the worn pig shuttle 204 may be mechanically shifted from the second position, as shown in FIG. 3B, back to the first position, as shown in FIG. 2 and FIG. 3A, i.e., slot 313 may be in substantial alignment with the worn pig receiver 208. With the worn pig shuttle 204 in the first position, valve 213 may be opened and the pig 201 may be pushed from slot 213 of the worn pig shuttle 204 into the worn pig receiver 208 through the use of a pusher 242, as described above. In one embodiment, a predetermined number of runs or loops for each pig may be selected, such that once a pig has been used for the predetermined number of times, the pig is considered worn and moved to the worn pig receiver 208.

Illustrative Embodiments:

In one embodiment, there is disclosed a pig launching system comprising a pipe loop comprising a first end and a second end; a pig shuttle connected to the first end and the second end; a first opening in the pig shuttle aligned with the first end of the pipe loop; a second opening in the pig shuttle aligned with the second end of the pipe loop; and a slot within the pig shuttle movable between the first opening and the second opening. In some embodiments, the system also includes a new pig cartridge connected to the pig shuttle. In some embodiments, the pig shuttle further comprises a third opening, wherein the third opening is aligned with the new pig cartridge. In some embodiments, the system also includes a second slot within the pig shuttle movable between the first opening and the third opening. In some embodiments, the system also includes a worn pig shuttle connected to the second end of the pipe loop. In some embodiments, the worn pig shuttle comprises a first opening aligned with the second end of the pipe loop, and a second opening aligned with a worn pig receiver. In some embodiments, the worn pig shuttle comprises a slot movable between the first opening of the worn pig shuttle and the second opening of the worn pig shuttle. In some embodiments, the system also includes a bypass pipe connected to the first end of the pipe at first point proximal to the pig shuttle and a second point distal to the pig shuttle. In some embodiments, the system also includes a bypass pipe connected to the second end of the pipe at first point proximal to the pig shuttle and a second point distal to the pig shuttle. In some embodiments, the system also includes a bypass pipe connected to the second end of the pipe at first point proximal to the worn pig shuttle and a second point distal to the pig shuttle.

Embodiments described herein may provide for one or more of the following advantages. In accordance with the present disclosure, a pig may be launched from and retrieved by a single system. This may eliminate the need for a separate pig handling system and a pig retrieving system. Further, the repositioning of pigs within the system may be accomplished mechanically rather than through fluid flow and can be controlled remotely from a surface control center. The operation of the valves and the pig shuttles may be two-position only, e.g., open/closed, up/down, in/out. This two-position operation may eliminate the need for intermediate positions, which may simplify operation of the system. In accordance with the present disclosure, a new pig may be added into the system from a subsea storage chamber. Similarly, a worn pig may be removed from the system by controlling the operation of the pig shuttles from a surface control center. The remote operation of the pig shuttles allows the addition and removal of pigs to and from the system to also be controlled remotely from the surface, which may simplify a pigging operation in a subsea environment.

While the present invention has been described in terms of various embodiments, modifications in the apparatus and techniques described herein may be made without departing from the concept of the present invention. It should be understood that embodiments and techniques described in the foregoing are illustrative and are not intended to limit the scope of the invention.

What is claimed is:

1. A pig launching system comprising:
a pipe loop comprising a first end and a second end;
a pig shuttle connected to the first end and the second end;
a worn pig shuttle connected to the second end of the pipe loop;
a first opening in the pig shuttle aligned with the first end of the pipe loop;
a second opening in the pig shuttle aligned with the second end of the pipe loop; and
a slot within the pig shuttle movable between the first opening and the second opening.

2. The system of claim 1, further comprising: a new pig cartridge connected to the pig shuttle.

3. The system of claim 2, wherein the pig shuttle further comprises a third opening, wherein the third opening is aligned with the new pig cartridge.

4. The system of claim 3, further comprising a second slot within the pig shuttle movable between the first opening and the third opening.

5. The system of claim 1, further comprising a worn pig receiver connected to the worn pig shuttle.

6. The system of claim 5, wherein the worn pig shuttle comprises a first opening aligned with the second end of the pipe loop, and a second opening aligned with the worn pig receiver.

7. The system of claim 6, wherein the worn pig shuttle comprises a slot movable between the first opening of the worn pig shuttle and the second opening of the worn pig shuttle.

8. The system of claim 5, further comprising a bypass pipe connected to the second end of the pipe at first point proximal to the worn pig shuttle and a second point distal to the pig shuttle.

9. The system of claim 1, further comprising a bypass pipe connected to the first end of the pipe at first point proximal to the pig shuttle and a second point distal to the pig shuttle.

10. The system of claim 1, further comprising a bypass pipe connected to the second end of the pipe at first point proximal to the pig shuttle and a second point distal to the pig shuttle.

* * * * *